UNITED STATES PATENT OFFICE.

AUGUST F. W. PARTZ, OF OAKLAND, CALIFORNIA.

IMPROVEMENT IN THE MANUFACTURE OF HARD SUGAR.

Specification forming part of Letters Patent No. 131,900, dated October 1, 1872.

*To all whom it may concern:*

Be it known that I, AUGUST F. W. PARTZ, of Oakland, in the county of Alameda and State of California, have invented a certain Improvement in the Manufacture of Hard Sugar, of which the following is a specification:

To show more clearly the object and nature of my invention, I will first briefly state the mode in which hard sugar is now generally made after the clarified saccharine juice has been concentrated. The magma of crystals and sirup as it comes from the vacuum-pan is cast into molds provided with tap-holes, which remain closed until most of the crystallizable sugar still held in solution by the sirup because of its elevated temperature, ranging between 160° and 205° of Fahrenheit, has solidified through the gradual cooling down of the mass to about 120°, whereupon the plugs are taken out, so that the sirup may flow off. The last portion of the sirup, however, requires to be displaced or washed out by a saturated solution of white sugar of a low temperature, which is poured upon the sugar under treatment, and from which, while passing through the same, small crystals are deposited, filling up the interstices between the larger crystals previously formed and thus rendering the mass more dense, though it yet remains of a plastic consistency, so that after breaking away a thin superficial crust it may be scooped out, resembling sugar taken from a centrifugal-machine, especially if it has before been cooled down to between 80° and 60° Fahrenheit. To obtain the sugar in a hard state, it is kept exposed to a temperature of from 100° to 110°, and the white "washing liquor" is allowed to drain off until the sugar has become firm enough to be handled without crumbling to pieces, when it is taken out of the molds and placed in a drying-room, where it is left until it has become "sounding" hard, which requires nearly a week's time. It is then frequently sawed or cut into small cubic lumps. Another more expeditious mode of making hard white sugar, now practiced to some extent, is by pressing moist granular sugar taken from a centrifugal-machine and drying it. But sugar made in this manner is of less density and firmness than that produced by casting, draining, and purging in molds, and the yield of first-grade sugar by the latter treatment is always larger than that obtained by means of centrifugal machines.

My invention aims at combining in a certain degree the advantages of the two methods above stated; and it consists in terminating the process first described when the "washing-liquor" has nearly drained off, taking the sugar in a moist granular state from the molds, transforming it by pressure into cubes, bars, or pieces of such other forms as may be desired, and drying them. In this manner an article similar in quality to "loaf-sugar" can be obtained directly in the most convenient and salable shape, while the faces of the pressed pieces will be found to have a crystalline luster instead of the chalky appearance produced by sawing, and the drying of them will generally be completed in less hours than it requires days for drying a "loaf" of sugar.

More fully and exactly stated, my process is as follows: The magma of crystals and sirup drawn from the vacuum-pan is cast into molds, the mass is allowed to "set," the sirup is drained off, and the "liquoring" is performed as usual; but when the last "white liquor" has been poured on, the temperature of the room in which the molds stand is lowered to from 80° to 60° of Fahrenheit, (or, if large molds with hot-water jackets are used, according to a recent patent of mine, the water is let out,) so that no heat is conveyed to the sugar from without, while the liquor in passing through it cools it within. After the liquor has so far drained off that the remainder left in the sugar is just sufficient to impart to it the necessary moistness—a matter easily determined by a few trials—a crust that has formed at the surface is broken away, the molds are emptied into a shallow receptacle, and as more liquor is retained in the lower than in the upper portion of the sugar, the granular mass is well mixed so as to render it homogeneous. The mass is now pressed into cubes or pieces of other shapes in like manner as that obtained from centrifugal-machines; but to avoid its hardening prematurely by exposure to the air, it must be taken from the molds and mixed not too far in advance of its being pressed, and both operations must be performed as near as possible, so as to keep pace with each other.

In executing this process I do not confine myself to the use of any particular form of molds, nor to that of any special machine or apparatus for pressing and shaping the sugar into cubes, bars, blocks, or slabs, as those devices which are employed to that end in working granular sugar from centrifugal-machines will equally answer my purpose.

What I claim as my invention is—

The process of taking sugar, while it is still in a plastic condition from molds in which it has been cast, drained, and purged, and transforming it by pressure into cubes or pieces of other forms, substantially as herein described.

AUGUST F. W. PARTZ.

Witnesses:
J. L. BOONE,
W. B. EWER.